Oct. 17, 1961

J. H. MYER 3,004,711

TEMPERATURE CONTROLLER

Filed April 28, 1958

Jon H. Myer,
INVENTOR.

BY

*Billy G. Robbins*

ATTORNEY.

United States Patent Office 3,004,711
Patented Oct. 17, 1961

3,004,711
TEMPERATURE CONTROLLER
Jon H. Myer, Los Angeles, Calif., assignor to Hughes Aircraft Company, Culver City, Calif., a corporation of Delaware
Filed Apr. 28, 1958, Ser. No. 731,504
11 Claims. (Cl. 236—15)

This invention relates to temperature control systems and more particularly to an apparatus for accurately controlling temperature within closely defined limits.

It has long been known in the prior art that a temperature control unit which is of the on-off type has a zone which extends over both sides of the actual "control point" within which there is no control or regulation of temperature. This zone is commonly referred to as the "dead zone." This zone results form the fact that in the unit the temperature of which is being controlled, the heating element is remote from the temperature sensing element, such as a thermocouple, with a mass intervening and, therefore, the temperature of the sensing element always lags behind the heating element temperature. This being the case the temperature control unit will, after an "on" cycle, remove power from the heating elements within the unit only after the temperature of the elements has risen beyond the "control point," resulting in overshoot.

The same occurs after an "off" cycle. The temperature will continue to drop below the "control point" since the sensing element of the controller lags behind and senses the control point temperature only after the temperature of the heating elements has fallen below the control point.

This dead zone has created a problem in the temperature control art particularly in those areas wherein it becomes desirable to control the temperature of a given unit such as a furnace or the like within closely specified limits.

One method of substantially eliminating this dead zone has long been known to the art and is very commonly referred to as the Gouy principle and the devices for practicing this principle are referred to as Gouy modulators. This principle is simply that the voltage which is generated by the thermocouple unit which is sampling the temperature to be controlled has superimposed thereon an oscilliating voltage in order to cause power to be applied or removed from the heating elements within the unit to be controlled sooner than it normally would be, and at a frequency greater than the normal temperature cycling of the unit itself. This results in a method of operation often called "proportional control" which means that the ration of "on" cycle duration to "off" cycle duration is proportional to the temperature deviation from the control point. In such a manner the average temperature of the unit remains substantially constant. A discussion of one type of Gouy modulator may be found by reference to Temperature, Its Measurement and Control in Science and Industry, published by Reinhold Publishing Corp., 1941, pages 613–616. It is therein shown that the thermocouple voltage is varied by varying the resistance of a 1 ohm resistance wire in series with the thermocouple. This variation is accomplished by shorting more or less of the resistance wire by passing a column of mercury thereover. This, in turn, is accomplished by containing the wire and mercury with a glass tube and oscillating the glass tube at a rate which is faster than the normal temperature cycling of the controller-furnace combination.

Other types of devices have also been employed to carry out the Guoy principle of temperature control. Examples of such devices are rotating potentiometers or automatically movable slide wires which are contained in series with the thermocouple circuit. Such devices are usually used in laboratories in connection with controllers which utilize mirror galvanometers and photocells to obtain the on-off control.

While these prior art circuits and devices have worked quite well, each of them has several inherent limitations and some disadvantages when applied to certain temperature control functions. In almost every instance wherein a mechanical device is utilized in order to obtain the voltage fluctuation desired, a rather complex and sometimes cumbersome mechanical machinery is involved. Such machinery becomes quite expensive and because it is complex, the maintenance problems with respect thereto become quite large. In addition, as above pointed out, many of these systems require high sensitivity meters or galvanometers in order to be effective. An additional problem is that when resistors or potentiometers or the like are placed in series with the thermocouple circuit and thereafter varied in order to vary the voltage in the thermocouple circuit, spurious voltages appear in the circuit which in turn cause erratic operation of the control apparatus itself. These voltages may be generated by the contact on the slide wire or rotating potentiometer moving over the potentiometer itself, or these voltages may be generated by the contacts between the resistance elements and the thermocouple circuit. This would result since the materials out of which the thermocouple circuit and the resistors themselves are constructed would be different.

Accordingly, it is an object of the present invention to provide a temperature control apparatus that is inexpensive to construct and is simple in operation.

It is another object of the present invention to provide an apparatus for controlling temperature which is very accurate.

It is another object of this invention to provide an apparatus which utilizes the proportional control principle.

It is yet another object of the present invention to provide an apparatus for controlling temperature which requires virtually no maintenance and which, in turn, has a long useful lifetime.

It is still another object of the present invention to provide an apparatus for controlling temperature in which quite inexpensive metering units may be utilized, while at the same time maintaining accurate control of temperature.

It is a still further object of the present invention to provide a temperature control apparatus that is constructed in such a manner as to keep foreign materials from the thermocouple circuit, therefore, eliminating introduction of spurious voltages into the thermocouple circuit.

It is a still further object of the present invention to provide a temperature control unit that is easily removed from operation without disturbing the continuity of the thermocouple circuit itself.

Temperature control apparatus, in accordance with the present invention, includes for utilization in a thermocouple control system means for generating a recurring magnetic field. At least one leg of the thermocouple circuit is coupled by means of suitable instrumentalities to said magnetic field in order to induce and superimpose a recurring voltage upon the voltage generated by the thermocouple unit.

Other and more specific objects of the present invention will become apparent from a consideration of the following description taken in conjunction with the accompanying drawing which is presented by way of example only and is not intended as a limitation upon the scope of this invention, in which.

Figure 1:
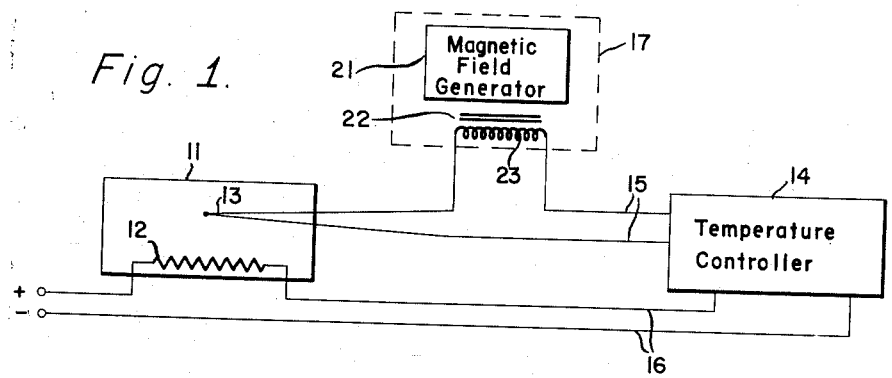
FIG. 1 is a schematic diagram partly in block form of a system employing the apparatus of the present invention.

Referring now to the drawing and more particularly to FIG. 1 thereof, there is illustrated a unit 11, the temperature of which is to be controlled. Unit 11 may be, for example, a furnace, an oven or the like. The apparatus of the present invention has been found to be exceedingly useful in accurately controlling the temperature of diffusion furnaces which are employed in the manufacture of semiconductor devices. Contained within unit 11 is a heating element 12 which provides the source of heat to maintain the temperature of unit 11 at the predetermined level. A thermocouple 13 is also provided within unit 11 in order to sample or sense the temperature thereof and to generate a voltage for controlling the temperature of unit 11. The voltage generated by thermocouple 13 is applied to temperature controller 14 by way of leads 15. The output of the temperature controller is then used by means of leads 16 to apply or disconnect power from heating element 12. Output leads 16 are connected to a source of power which, for example, may be a direct current source as indicated by the pulse and minus terminals to which leads 16 are connected. It should also be expressly understood, however, that the source of power may be of any given type in order to accomplish the desired results.

The apparatus of the present invention is shown within dash-block 17 and includes a magnetic field or permanent magnet generator 21 and means 22 such as a magnetic core for transferring the magnetic field which is generated by generator 21 to the thermocouple circuit of thermocouple 13. This is accomplished by way of a winding 23 which is coupled by means of core 22 to the magnetic field. Winding 23 may consist of the thermocouple lead itself, or in the alternative may consist of one leg of the thermocouple extension circuit. The latter case is particularly useful when the temperature controller 14 is a distance from thermocouple 13.

Figure 2:
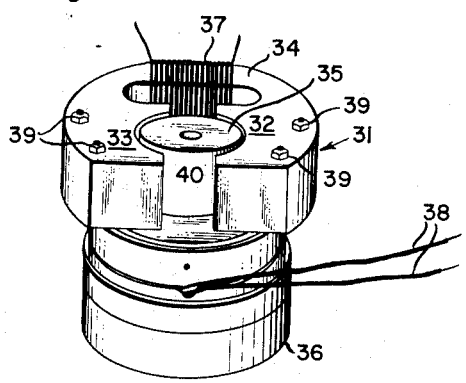
FIG. 2 is an isometric drawing of one portion of the system as illustrated in FIG. 1.

The apparatus contained within dashed-block 17 is shown more in detail in FIG. 2 to which reference is hereby made. There is illustrated therein an apparatus for generating the magnetic field and for coupling it to the thermocouple circuit. Such an apparatus may comprise, for example, a horseshoe-shaped unit or core 31 which has pole pieces 32 and 33, a flux path means or bight section 34 is provided for interconnecting pole pieces 32 and 33. The pole pieces and interconnecting flux path, for example, may be constructed of mild steel. A magnet 35 is rotatably disposed between pole pieces 32 and 33 by means of motor 36 to which it is attached. Magnet 35 may be, for example, a disc-shaped Alnico magnet which is magnetized parallel to its diameter. The air gap between the surface of magnet 35 and pole pieces 32 and 33 is not critical and in the presently preferred embodiment of this apparatus is approximately 1/16 of an inch. The horseshoe-shaped flux path 31 is supported upon motor 36 by means of bolts 39. Magnet 35 is supported upon shaft 40 of motor 36, such as by being press fitted thereon. As hereinabove discussed with regard to FIG. 2, the thermocouple lead, for a circuit extension thereof, may be wound in the form of a winding 37 about the bight section 34. The number of turns required to make up the winding for any given application will, of course, vary. Using the structure of FIG. 2, if the magnet is rotated at a speed of 23 r.p.m., it has been found that approximately 10 turns provide excellent results.

Leads 38, attached to motor 36, may be connected to a source of alternating current for energizing it. Motor 36 may be of any type which is desired for a particular application. With a configuration for the apparatus as shown in FIG. 2, a synchronous clock motor of approximately 4 watts in power has been found to work quite successfully. Upon application of power, motor 36 will rotate and in turn rotate magnet 35 between pole pieces 32 and 33. This rotation sets up a varying magnetic flux in core 31, which in the presently preferred embodiment is substantially sinusoidal. This flux will cut the turns of winding 37 of the thermocouple circuit thereby inducing a periodically recurring voltage therein. Since the winding 37 is an integral part of the thermocouple circuit, a voltage induced therein will be superimposed upon the voltage generated by thermocouple 13 and will, in turn, be applied by way of leads 15 to temperature controller 14 as shown in FIG. 1.

The voltage generated, and the frequency thereof, will of course vary with the speed of rotation of magnet 35 and with the number of turns of winding 37 wound upon flux path or bight section 34. It has been found that a frequency within the range of 1/10 to 10 cycles per second works exceedingly well and that a voltage range from 0 up to approximately 5 millivolts gives quite satisfactory results. The amplitude of the generated voltage also may be controlled by placing a magnetic shunt in parallel with the windings 37.

Figure 3:
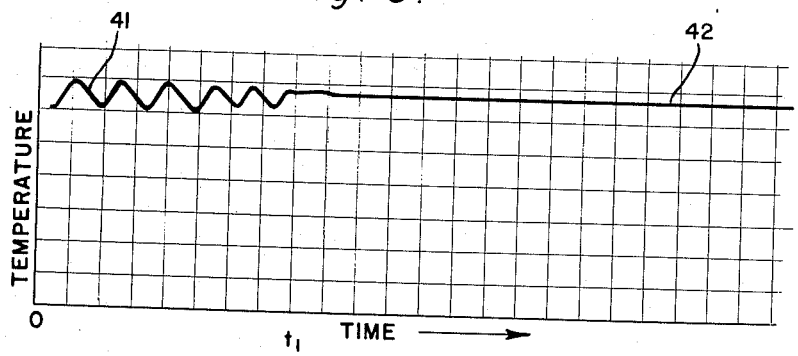
FIG. 3 is a graph illustrating the accuracy of temperature control utilizing a system embodying the apparatus of the present invention.

The results obtained by the apparatus of the present invention can be seen by referring to FIG. 3. The graph therein represents temperature along the ordinate taken with respect to time plotted along the abscissa. The temperature of unit 11 (the control point) was set to be approximately at the center of the fluctuating portions of the curve as shown by dashed-line 41. The first portion of the curve between 0 and $t_1$ was taken during the time that the apparatus of the present invention was disconnected from the circuit. It can be seen that the temperature of unit 11 fluctuated from a point below the control point temperature to a point above the control point, thus illustrating the dead-zone hereinabove referred to. At time $t_1$ the apparatus of the present invention, and as illustrated in FIG. 2, was placed into operation. This apparatus thereafter maintained the temperature of unit 11 substantially constant as seen by the straight-line portion 42 of the curve.

It can be seen that the apparatus of the present invention, as illustrated in FIG. 2, may be removed from operation, if such is desired, merely by removing the source of voltage which is applied to leads 38 thereof. This will stop rotation of magnet 35 and thus remove the fluctuating voltage present in windings 37. It should be noted, however, that no spurious voltages will be introduced into the thermocouple circuit since it will not be broken in any way.

Figure 4:
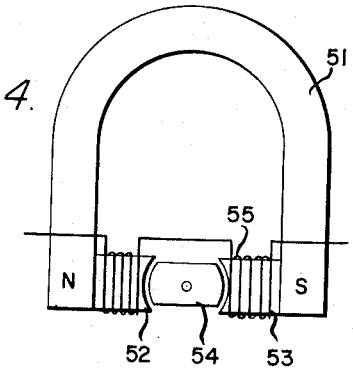
FIG. 4 is an alternative embodiment of the apparatus illustrated in FIG. 2.

An alternative embodiment of a means for generating a magnetic field and coupling the same to a thermocouple circuit is illustrated in FIG. 4. There is disclosed therein a magnet 51 having North and South poles. Magnet 51 may be, for example, an electromagnet or a permanent magnet and for purposes of discussion it will be presumed to be a permanent magnet. Pole pieces 52 and 53 are attached to the permanent magnet 51 in such a manner as to provide a flux path between the poles which is broken. An armature means 54 of magnetic material is rotatably supported, by means not shown, between pole pieces 52 and 53 in such a manner that when it is in the position as shown, it will substantially complete the flux path between the North and South poles of magnet 51, but when in a position 90° from that as illustrated, the flux path will be interrupted. In this manner, the rotation of armature 54 by means not shown such as a motor, a varying voltage will be induced in series connected windings 55 which are wound upon pole pieces 52 and 53 and which constitute a portion of the thermocouple circuit as illustrated in FIG. 1. Pole pieces 52 and 53 and armature 54 may be constructed, for example, from mild steel.

It should become readily apparent at this point that the means for generating the magnetic field may vary in accordance with design considerations for any particular application without deviating from the scope of this invention. For example, a pendulum means or a metronome means may be substituted for rotating magnet 35 or mild steel armature 54, while still accomplishing the same result. It should further be pointed out that although the magnet 35, as illustrated in FIG. 2, will generate substantially sinusoidal voltage waveform in winding 37, and armature 54 a half-wave sinusoidal form, that such is not necessary to obtain the results desired in accordance with the present invention. Any source of a magnetic field which will generate a recurring waveform of voltage in winding 37 will operate satisfactorily.

There has thus been disclosed an apparatus for effecting proportional temperature control of a given unit which is simple but at the same time maintains very accurate control and requires little or no maintenance and is therefore more economical than apparatus heretofore known in the art.

What is claimed is:

1. In a thermocouple temperature control system having a thermocouple and circuit therefor for controlling the temperature of a given unit, the improvement for overcoming thermal and mechanical lag which may be present in the system comprising: a pair of pole pieces, a flux path interconnecting said pole pieces, a disc-shaped magnet rotatably supported between said pole pieces, means for rotating said magnet at a substantially constant speed, windings wound upon said flux path, said windings being a part of said thermocouple circuit whereby a low amplitude, low frequency periodically recurring magnetic field is generated by the rotation of said magnet and a low amplitude, low frequency periodically recurring voltage is superimposed upon a voltage generated by said thermocouple.

2. In a thermocouple temperature control system for controlling the temperature of a given unit, the improvement for overcoming thermal and mechanical lag which may be present in the system comprising: first and second pole pieces, a low reluctance flux path interconnecting said pole pieces, a permanent magnet supported to move between said pole pieces, means for rotating said magnet at a substantially constant speed at least one thermocouple lead wound upon said flux path, whereby a substantially constant frequency and amplitude waveform voltage is induced in said winding when said magnet moves between said pole pieces and is superimposed upon a voltage generated by said thermocouple.

3. In a thermocouple temperature control system having a thermocouple and circuit therefor for controlling the temperature of a given unit, the improvement for overcoming thermal and mechanical lag which may be present in the system comprising: a magnet having North and South poles, means having first and second pole pieces and providing an interrupted flux path between said poles, means movably supported to periodically substantially close said flux path, a winding upon said flux path means, said winding including at least a portion of said thermocouple circuit, whereby a substantially constant amplitude and frequency waveform voltage is induced in said winding when said magnet moves between said pole pieces and is superimposed upon a voltage generated by said thermocouple.

4. In a thermocouple temperature control system having a thermocouple and circuit therefor for controlling the temeprature of a given unit, the improvement for overcoming thermal and mechanical lag which may be present in the system comprising: a magnet, means comprising first and second pole pieces forming a flux path cooperating with said magnet, a winding including at least a portion of said thermocouple circuit upon said flux path, means for periodically varying the reluctance of said flux path, whereby a substantially constant amplitude and frequency waveform voltage is induced in said winding when said magnet moves between said pole pieces and is superimposed upon a voltage generated by said thermocouple.

5. A system for controlling the temperature of a given unit comprising: a thermocouple circuit comprising a thermocouple for sampling the temperature of said unit and generating a voltage in response thereto, a heating element, a control unit connected between the thermocouple and the heating element for causing said heating element to apply heat to the unit when the voltage in said thermocouple falls below a predetermined point, magnetic field generator means for generating a magnetic field about a portion of said thermocouple circuit and mechanical means coupled to said generator means, for periodically varying said magnetic field, thus superimposing a constant low frequency, constant low amplitude voltage upon the voltage generated by said thermocouple.

6. In a thermocouple temperature control system having a thermocouple and circuit therefor for controlling the temperature of a given unit, the improvement for overcoming thermal and mechanical lag which may be present in the system comprising: a magnet having North and South poles, means providing an interrupted flux path between said poles, means movably supported to periodically substantially close said flux path, a winding upon said flux path means, said winding including at least a portion of said thermocouple circuit, a magnetic field generator, a magnetic flux path cooperating with said generator, and a winding upon said flux path including one portion of a circuit connected to said thermocouple for superimposing a constant low frequency, constant low amplitude voltage upon the voltage generated by said thermocouple.

7. In a thermocouple temperature control system having a thermocouple circuit comprising a thermocouple, and a temperature controller responsive to the temperature induced voltage of said thermocouple, the improvement for overcoming thermal and mechanical lag which may be present in the system, which improvement comprises: means for generating in said thermocouple circuit an independent recurring waveform voltage, said means consisting essentially of magnetic field generating means inductively coupled to said thermocouple circuit, and mechanical means coupled to said generating means for periodically varying the magnetic field generated thereby, whereby to induce voltage changes in said circuit.

8. A system according to claim 7 wherein said voltage waveform is of a substantially constant frequency.

9. A system accordng to claim 7 wherein said waveform is of a frequency from 1/10 to 10 cycles per second.

10. A system according to claim 7 wherein said waveform voltage has a substantially constant amplitude.

11. A system according to claim 7 wherein said waveform voltage has an amplitude of from 0 to 5 millivolts.

References Cited in the file of this patent

UNITED STATES PATENTS

| | | |
|---|---|---|
| 1,987,539 | Razek | Jan. 8, 1935 |
| 2,113,436 | Williams | Apr. 15, 1938 |
| 2,218,859 | Schweitzer | Oct. 22, 1940 |
| 2,220,028 | Smith | Oct. 29, 1940 |
| 2,233,924 | McKibben | Mar. 4, 1941 |
| 2,376,488 | Jones | May 22, 1945 |
| 2,696,739 | Endres | Dec. 14, 1954 |

UNITED STATES PATENT OFFICE
CERTIFICATE OF CORRECTION

Patent No. 3,004,711            October 17, 1961

Jon H. Myer

It is hereby certified that error appears in the above numbered patent requiring correction and that the said Letters Patent should read as corrected below.

Column 1, line 17, for "form" read -- from --; line 63, for "with" read -- within --; column 3, line 27, for "pulse" read -- plus --; line 65, for "for" read -- or --; column 5, line 66, for "temeprature" read -- temperature --.

Signed and sealed this 3rd day of April 1962.

(SEAL)
Attest:

ERNEST W. SWIDER
Attesting Officer

DAVID L. LADD
Commissioner of Patents